United States Patent
Chen et al.

(10) Patent No.: US 10,931,156 B2
(45) Date of Patent: Feb. 23, 2021

(54) MAGNET MODULE AND FAN WITH MAGNET MODULE

(71) Applicant: DELTA ELECTRONICS, INC., Taoyuan Hsien (TW)

(72) Inventors: Hung-Chi Chen, Taoyuan Hsien (TW); Han-En Chien, Taoyuan Hsien (TW); Meng-Yu Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 198 days.

(21) Appl. No.: 14/523,598

(22) Filed: Oct. 24, 2014

(65) Prior Publication Data

US 2015/0214796 A1 Jul. 30, 2015

(30) Foreign Application Priority Data

Jan. 27, 2014 (TW) ................. 103102876

(51) Int. Cl.
| | |
|---|---|
| *H02K 1/27* | (2006.01) |
| *F04D 25/06* | (2006.01) |
| *H02K 7/14* | (2006.01) |
| *H02K 1/28* | (2006.01) |
| *F04D 29/28* | (2006.01) |

(52) U.S. Cl.
CPC ....... *H02K 1/2786* (2013.01); *F04D 25/0633* (2013.01); *F04D 29/282* (2013.01); *H02K 1/28* (2013.01); *H02K 7/14* (2013.01)

(58) Field of Classification Search
CPC .......... H02K 1/2786; H02K 1/28; H02K 7/14; H02K 1/18; H02K 1/17; H02K 21/26; H02K 23/04; F04D 25/0633; F04D 29/282

USPC ........... 310/154.03, 154.08, 154.09, 154.07, 310/154.12, 154.13, 154.16, 154.17, 310/156.33, 156.29, 156.03, 156.08, 310/156.24

See application file for complete search history.

(56) References Cited

U.S. PATENT DOCUMENTS

| | | | | |
|---|---|---|---|---|
| 2,652,504 A | * | 9/1953 | Pinter | ......... H02K 21/225 |
| | | | | 310/156.55 |
| 3,828,212 A | * | 8/1974 | Harkness | ............ H02K 15/03 |
| | | | | 310/153 |

(Continued)

FOREIGN PATENT DOCUMENTS

| | | |
|---|---|---|
| CN | 101552502 A | 10/2009 |
| CN | 201355778 Y | 12/2009 |

(Continued)

OTHER PUBLICATIONS

Miller, Propulsion Systems for Hybrid Vehicles, 2010, The Institution of Engineering and Technology, Second Edition, pp. 243-323.*

*Primary Examiner* — Peter J Bertheaud
*Assistant Examiner* — Geoffrey S Lee
(74) *Attorney, Agent, or Firm* — Muncy, Geissler, Olds & Lowe, P.C.

(57) ABSTRACT

A magnet module is disclosed. The magnet module includes a sintered magnet structure, a magnetic permeable casing and a fixing member. The sintered magnet structure is disposed in the magnetic permeable casing. The fixing member has a plurality of locking units, and the sintered magnet structure and the magnetic permeable casing are fixed by the locking units of the fixing member.

11 Claims, 8 Drawing Sheets

(56) References Cited

U.S. PATENT DOCUMENTS

| | | | | |
|---|---|---|---|---|
| 3,855,374 | A * | 12/1974 | Brailowsky | C04B 35/2683 264/428 |
| 4,012,651 | A * | 3/1977 | Burson | H02K 1/2786 310/153 |
| 4,056,744 | A * | 11/1977 | Blanchard | H02K 5/24 310/51 |
| 4,687,608 | A * | 8/1987 | Eino | C04B 35/2683 264/611 |
| 5,206,556 | A * | 4/1993 | Hayakawa | H02K 1/17 310/154.28 |
| 5,584,114 | A * | 12/1996 | McManus | F16C 35/02 264/272.2 |
| 6,025,665 | A * | 2/2000 | Poag | H02K 1/278 310/68 B |
| 6,060,799 | A * | 5/2000 | McManus | H02K 1/17 29/596 |
| 6,933,645 | B1 * | 8/2005 | Watson | H02K 1/2773 310/156.08 |
| 7,091,635 | B1 * | 8/2006 | Gilliland | F04D 29/282 310/62 |
| 7,548,006 | B2 * | 6/2009 | Yu | H02K 1/17 310/156.12 |
| 8,779,638 | B2 * | 7/2014 | Burton | H02K 1/2753 29/596 |
| 2001/0010440 | A1 * | 8/2001 | Ortt | H02K 1/17 310/154.08 |
| 2002/0135252 | A1 * | 9/2002 | Burton | H02K 1/278 310/156.12 |
| 2002/0171307 | A1 * | 11/2002 | Verbrugge | H02K 1/27 310/156.12 |
| 2002/0190583 | A1 * | 12/2002 | Ortt | H02K 1/28 310/47 |
| 2003/0146666 | A1 * | 8/2003 | Uemura | H02K 15/03 310/43 |
| 2004/0104636 | A1 * | 6/2004 | Ortt | H02K 1/17 310/154.08 |
| 2004/0113504 | A1 * | 6/2004 | Agnes | H02K 1/17 310/154.08 |
| 2005/0121990 | A1 * | 6/2005 | Kaneko | H02K 1/276 310/156.47 |
| 2007/0090704 | A1 | 4/2007 | Chen | |
| 2008/0036313 | A1 * | 2/2008 | Jiang | F04D 25/0613 310/46 |
| 2008/0169719 | A1 * | 7/2008 | Yu | H02K 1/17 310/156.08 |
| 2008/0203837 | A1 * | 8/2008 | Tang | H02K 1/2786 310/89 |
| 2008/0256784 | A1 * | 10/2008 | Cervenka | H02K 1/2786 29/598 |
| 2009/0251022 | A1 * | 10/2009 | Iversen | H02K 1/2786 310/156.12 |
| 2009/0284092 | A1 * | 11/2009 | Horng | F04D 29/646 310/156.12 |
| 2010/0164316 | A1 * | 7/2010 | Langford | H02K 1/2793 310/156.29 |
| 2010/0327688 | A1 * | 12/2010 | Canini | H02K 1/14 310/91 |
| 2013/0026877 | A1 * | 1/2013 | Matsuda | H02K 23/04 310/216.106 |
| 2013/0058812 | A1 * | 3/2013 | Kim | F04D 13/027 417/420 |
| 2013/0099617 | A1 * | 4/2013 | Chamberlin | H02K 1/2766 310/156.21 |
| 2013/0135069 | A1 * | 5/2013 | Miyamoto | C22C 38/10 335/302 |
| 2013/0154426 | A1 * | 6/2013 | Melfi | H02K 21/46 310/156.78 |
| 2013/0200735 | A1 * | 8/2013 | Lynch | H02K 1/28 310/59 |
| 2014/0203679 | A1 * | 7/2014 | Klontz | H02K 1/27 310/114 |
| 2015/0340930 | A1 * | 11/2015 | Yin | H02K 1/2786 310/61 |

FOREIGN PATENT DOCUMENTS

| | | | |
|---|---|---|---|
| CN | 102684339 A | 9/2012 | |
| EP | 1536543 A1 * | 6/2005 | .......... H02K 1/2786 |
| TW | M288657 | 3/2006 | |
| TW | M361169 | 7/2009 | |
| TW | M378567 | 4/2010 | |

* cited by examiner

MAGNET MODULE AND FAN WITH MAGNET MODULE

CROSS REFERENCE TO RELATED APPLICATIONS

This Non-provisional application claims priority under 35 U.S.C. § 119(a) on Patent Application No(s). 103102876 filed in Taiwan, Republic of China on Jan. 27, 2014, the entire contents of which are hereby incorporated by reference.

BACKGROUND OF THE INVENTION

Field of Invention

The present invention relates to a magnet module and, in particular, to a magnet module applied to a fan.

Related Art

The rotor structure of a conventional fan includes a shaft and an iron casing. The shaft is connected to the iron casing through a copper bushing. After tightly assembling the iron casing and the shaft, a plurality of magnets are then attached to the inside of the iron casing so as to form a rotor. Afterwards, the rotor is assembled with other components of the fan such as an impeller.

As mentioned above, the conventional method of tightly assembling the iron casing and the shaft and attaching magnets still needs at least two improvements. Firstly, the iron casing is made of a drawing process, which usually generates a lot of waste materials during the process, so the manufacturing cost thereof is high. Secondly, the magnets are usually attached to the iron casing by glue. After the rotor assembly operates for a long time, the magnets have high risk to be loosened. Moreover, the process of attaching the magnets to the iron casing is usually performed by hands or cooperating with a precise machine. However, if the process is performed by hands, the entire product yield is unreliable; if the process is performed by a precise machine, the manufacturing cost will be extremely increased.

No matter which approach is selected to attach the magnets to the iron casing, it is still existing problems in completely coating the glue and detecting the glue coating result. To solving the above problems, the conventional approach is to use a high quality glue for fixing the magnets on the iron casing. However, using the high quality glue is really not a good choice due to the economy concern.

Therefore, it is an important subject to provide a proper method for bonding the magnets and the iron casing so as to improve the above problems.

SUMMARY OF THE INVENTION

In view of the foregoing subject, an objective of the invention is to provide a magnet module with improved bonding between the magnets and the iron casing.

To achieve the above objective, the present invention discloses a magnet module including a sintered magnet structure, a magnetic permeable casing and a fixing member. The sintered magnet structure is disposed in the magnetic permeable casing. The fixing member has a plurality of locking units, and the sintered magnet structure and the magnetic permeable casing are fixed by the locking units of the fixing member.

In one embodiment of the invention, the magnet module comprises a plurality of sintered magnets configured in an annular arrangement.

In one embodiment of the invention, the fixing member is composed of a plurality of assembling members.

In one embodiment of the invention, the fixing member includes a first assembling member and a second assembling member. The first assembling member includes a plurality of first locking units, and the second assembling member includes a plurality of second locking units. The first locking units and the second locking units define an accommodating space, and the sintered magnet structures and the magnetic permeable casing are fixed in the accommodating space.

In one embodiment of the invention, the sintered magnet structure is a ferric oxide magnet.

To achieve the above objective, the present invention also discloses a fan, which includes a frame, a stator structure, a rotor structure and a magnet module. The stator structure is connected to the frame, and the rotor structure is disposed corresponding to the stator structure. The rotor structure has a shaft, and the magnet module is connected to the rotor structure.

The magnet module includes a sintered magnet structure, a magnetic permeable casing and a fixing member. The sintered magnet structure is disposed in the magnetic permeable casing. The fixing member has a plurality of locking units. The sintered magnet structure and the magnetic permeable casing are fixed by the locking units of the fixing member.

In one embodiment of the invention, the magnet module includes a plurality of sintered magnets configured in an annular arrangement.

In one embodiment of the invention, the fixing member of the magnet module is composed of a plurality of assembling members.

In one embodiment of the invention, the fixing member of the magnet module includes a first assembling member and a second assembling member. The first assembling member includes a plurality of first locking units, and the second assembling member includes a plurality of second locking units. The first locking units and the second locking units define an accommodating space, and the sintered magnet structures and the magnetic permeable casing are fixed in the accommodating space.

In one embodiment of the invention, the magnet module and the rotor structure are connected by insert molding, adhering or engagement.

In one embodiment of the invention, the sintered magnet structure is a ferric oxide magnet.

Accordingly, in the magnet module of the invention, the sintered magnet structure(s) and the magnetic permeable casing are assembled in advance via the fixing member instead of the conventional attaching method by glue. This modification can improve the conventional problems of the attaching process in completely coating the glue and detecting the glue coating result.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The magnet module of the invention can be applied to a centrifugal fan or an axial-flow fan depending on different requirements. Although the following embodiments only disclose the examples of axial-flow fans, those skilled persons in the art should understand that the same design can also be applied to a centrifugal fan. In brief, the applicable fan of the invention is not limited to the following embodiments.

Figure 1:
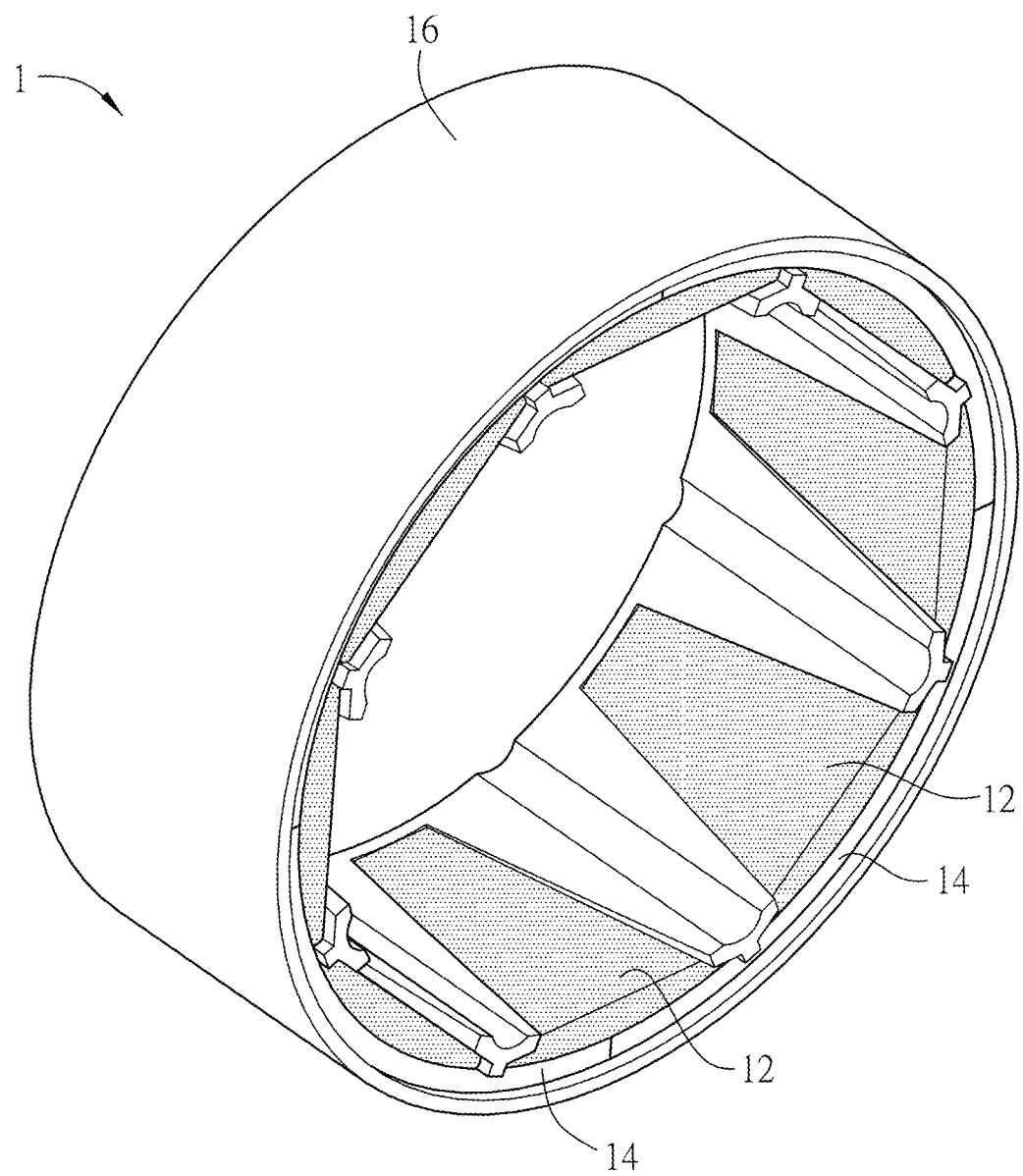
FIG. 1 is a schematic diagram showing a magnet module according to a first embodiment of the invention.
Figure 2:
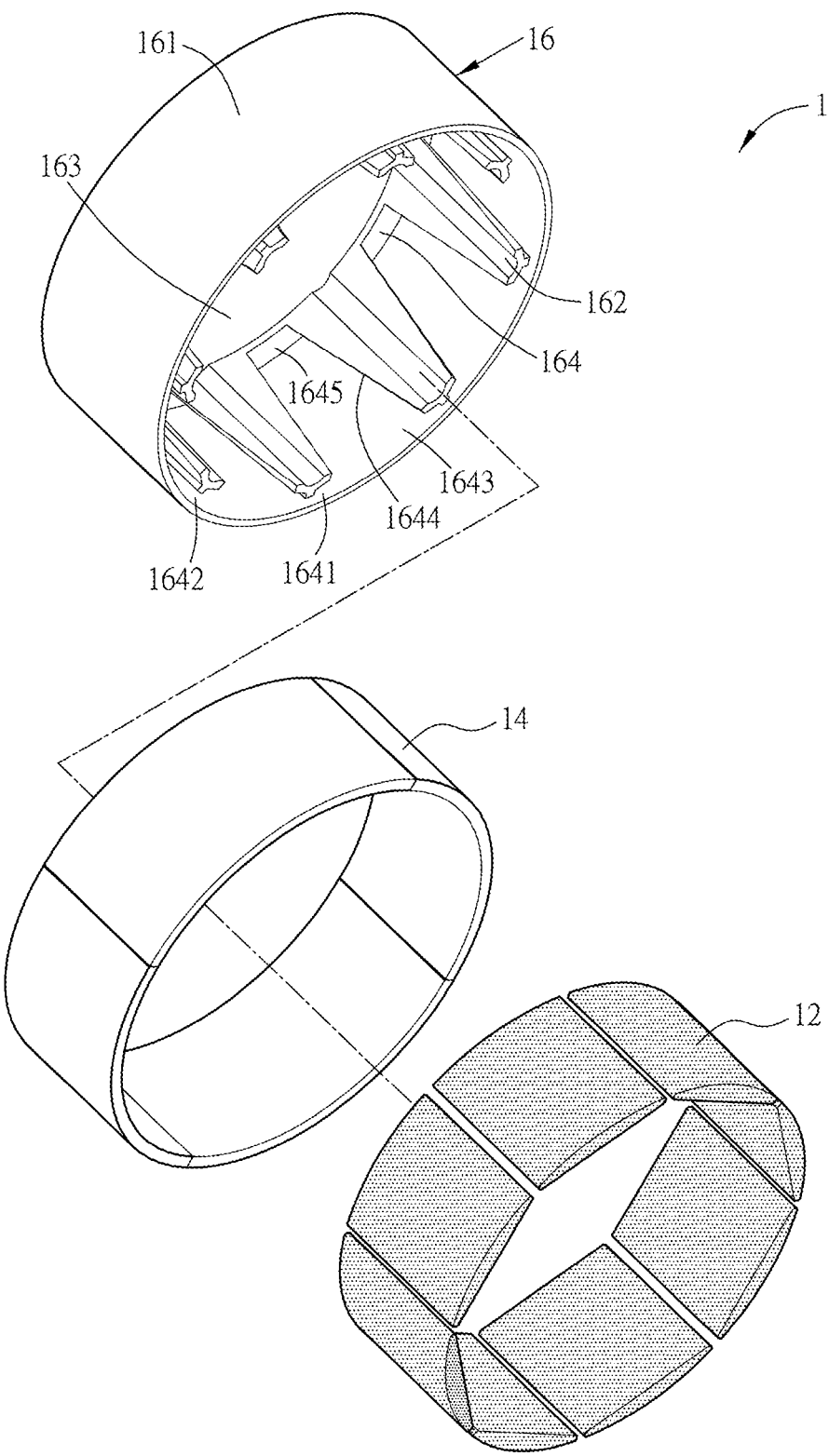
FIG. 2 is an exploded view of FIG. 1.

FIG. 1 is a schematic diagram showing a magnet module according to a first embodiment of the invention, and FIG. 2 is an exploded view of FIG. 1.

As shown in FIGS. 1 and 2, a magnet module 1 includes a sintered magnet structure 12, a magnetic permeable casing 14 and a fixing member 16.

The sintered magnet structure 12 is disposed in the magnetic permeable casing 14. In practice, the sintered magnets of the sintered magnet structure 12 are simply arranged around the inner side of the magnetic permeable casing 14, and the additional glue for attaching the sintered magnet structures to the inner side is not needed. In view of FIG. 2, the shape of the magnetic permeable casing 14 can be designed depending on the sinter magnet(s) 12. For example, the sintered magnet structures 12 are ferric oxide magnet.

The fixing member 16 has a plurality of locking units 162, each of which forms a locking recess or an accommodating space, so that the sinter magnet(s) 12 and the magnetic permeable casing 14 can be locked and fixed by the locking units 162 of the fixing member 16. In other words, the locking recesses or accommodating spaces of the locking units 162 are configured for fixing the relative positions of the sinter magnets 12 and the magnetic permeable casing 14. This structural design can easily replace the conventional process of attaching the sintered magnet structures to the casing. In the embodiment, the fixing member is a fixing ring. The fixing ring comprises a ring body 161, an axial passage 163 axially through the ring body 161, and a slot 164 inside the ring body 161. The slot 164 has at least one radially varied-width slot portion 1641, a circular slot portion 1642, an outer lateral 1643 at the ring body 161, an inner lateral 1644, a bottom 1645 connected between the outer lateral 1643 and the inner lateral 1644 to form the varied-width slot portion 1641 and the circular slot portion 1642 between the outer lateral 1643 and the inner lateral 1644. The ring body 161, the outer lateral 1643, the inner lateral 1644 and the bottom 1645 are integrally formed as one piece. The axial passage 163, the inner lateral 1644, the varied-width slot portion 1641, the circular slot portion 1642, the outer lateral 1643 and the ring body 161 are in order in a radial direction outwardly. The magnetic permeable casing 14 is axially inserted into the circular slot portion 1642 of the slot 164, fixedly accommodated and positioned in the circular slot portion 1642 of the slot 164. The sintered magnet structure 12 is axially inserted into the varied-width slot portion 1641 of the slot 164, fixedly accommodated and positioned in the varied-width slot portion 1641 of the slot 164, and faces the axial passage 163 of the fixing ring 16. The sintered magnet structure 12 has a varied thickness, and the sintered magnet structure 12 is thickest at its middle. The magnetic permeable casing 14 is ring-shaped and has an uniform thickness. The inner lateral 1644 has a plurality of claws. The claws are formed by the locking units 162 and extend axially from the bottom 1645. The sintered magnet structure 12 is radially disposed between the claws and the magnetic permeable casing 14.

In brief, the sintered magnet structures 12 can be directly positioned (without adhesion or glue) on the inner side (inner surface) of the magnetic permeable casing 14, and then the fixing member 16 is provided to fix the relative positions of the sintered magnet structures 12 and the magnetic permeable casing 14.

As mentioned above, the fixing method of this embodiment is much firmly and stable than the conventional attaching process. Besides, the disclosed fixing method can solve the problems of the conventional attaching process in completely coating the glue and detecting the glue coating result, so that the lifespan of the magnet module 1 can be effectively extended.

To be noted, the sintered magnet structure 12 of the embodiment is a permanent magnet and is at least partially formed by ferrite material. In addition, the magnet module 1 may include a plurality of sintered magnets configured in an annular arrangement.

Figure 3:
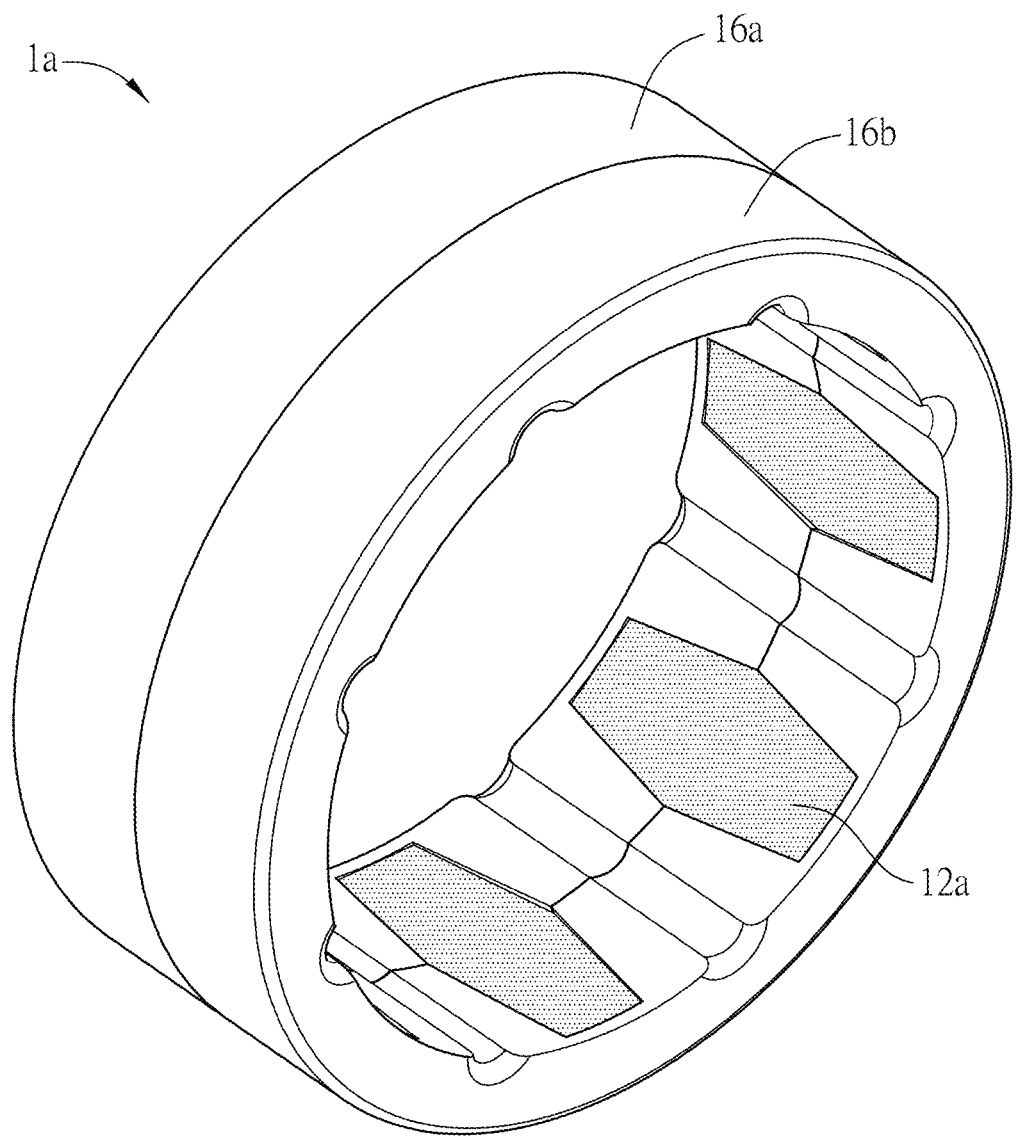
FIG. 3 is a schematic diagram showing a magnet module according to a second embodiment of the invention.
Figure 4:
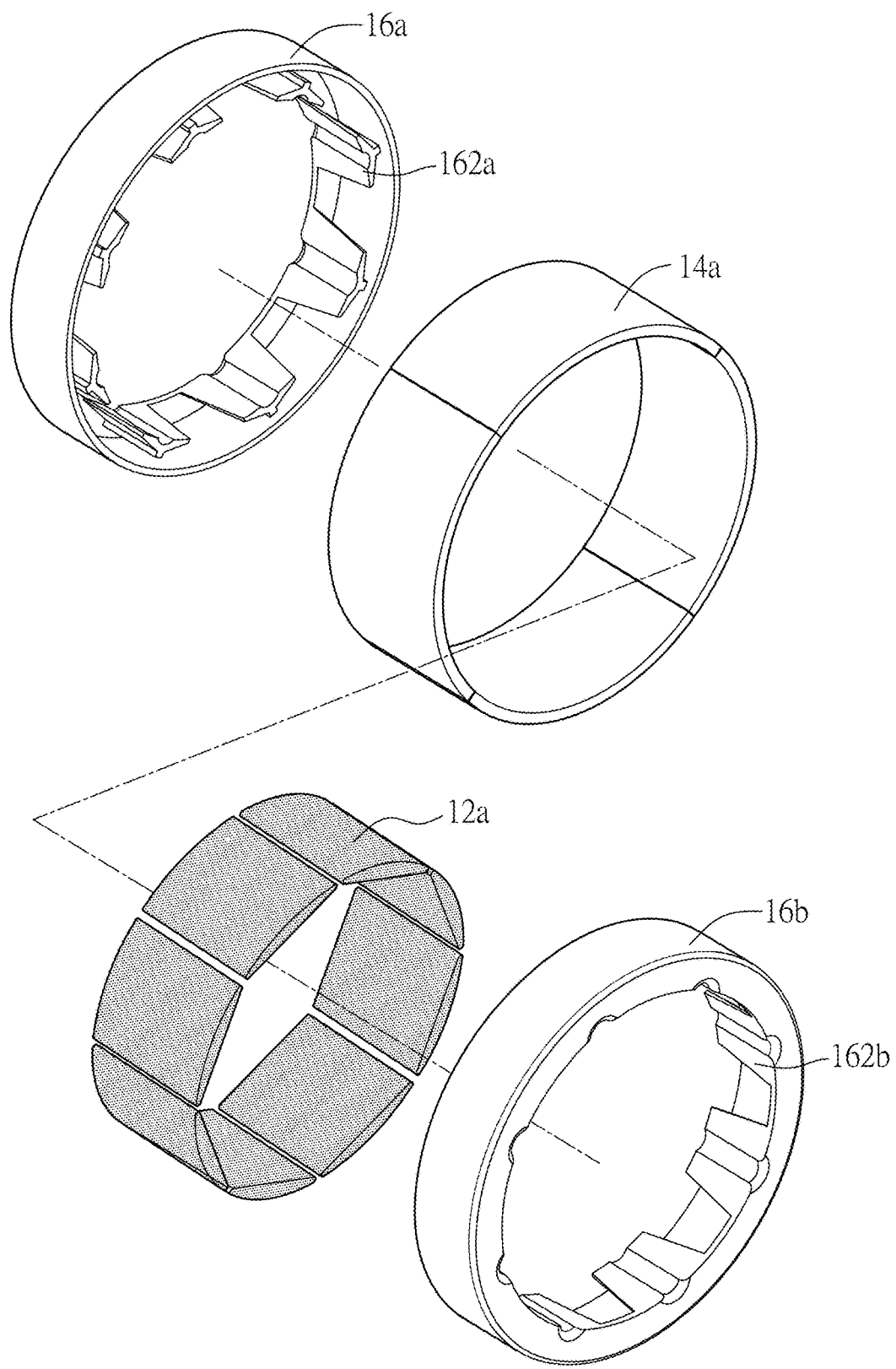
FIG. 4 is an exploded view of FIG. 3.

FIG. 3 is a schematic diagram showing a magnet module according to a second embodiment of the invention, and FIG. 4 is an exploded view of FIG. 3.

Referring to FIGS. 3 and 4, the magnet module 1a of the invention includes a sintered magnet structure 12a, a magnetic permeable casing 14a and a fixing member.

Different from the previous embodiment, the fixing member of the second embodiment is composed of a plurality of assembly members. In more detail, the fixing member includes a first assembling member 16a and a second assembling member 16b. The first assembling member 16a includes a plurality of first locking units 162a, and the second assembling member 16b includes a plurality of second locking units 162b. The first locking units 162a and the second locking units 162b define one or more accommodating spaces, and the sintered magnet structure(s) 12a and the magnetic permeable casing 14a are fixed in the accommodating spaces.

Similarly, the fixing member of this embodiment can fix the relative positions of the sintered magnet structure(s) 12a and the magnetic permeable casing 14a instead of the conventional attaching process. Compared with the first embodiment, the fixing member of the second embodiment is manufactured in two separated parts. Accordingly, the mold cost of the second embodiment is lower and the manufacturing process is much easier.

The other components of the magnet module 1a and the relationships therebetween are similar to the previous embodiment, so the detailed descriptions thereof will be omitted.

Figure 5:
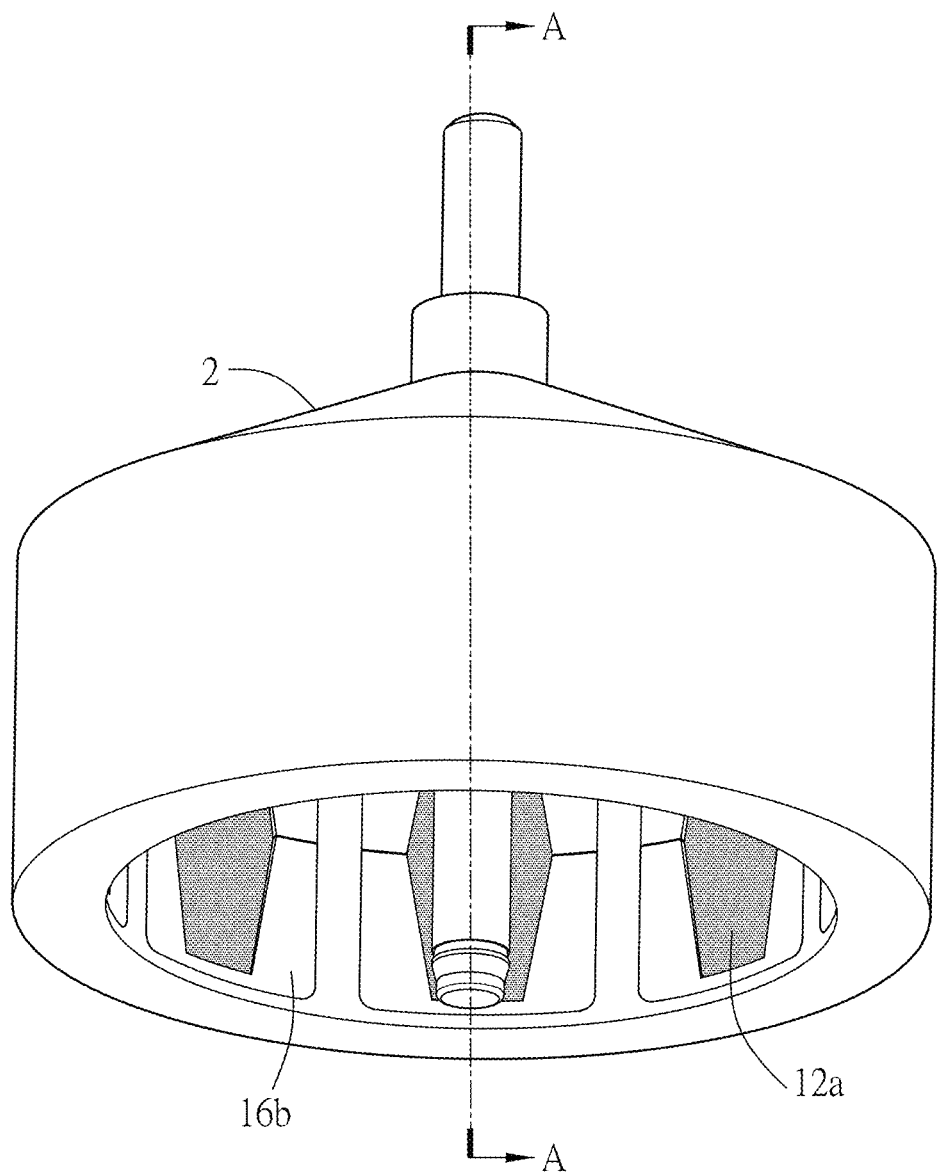
FIG. 5 is a schematic diagram showing the magnet module of FIG. 3 in cooperation with a rotor structure.
Figure 6:
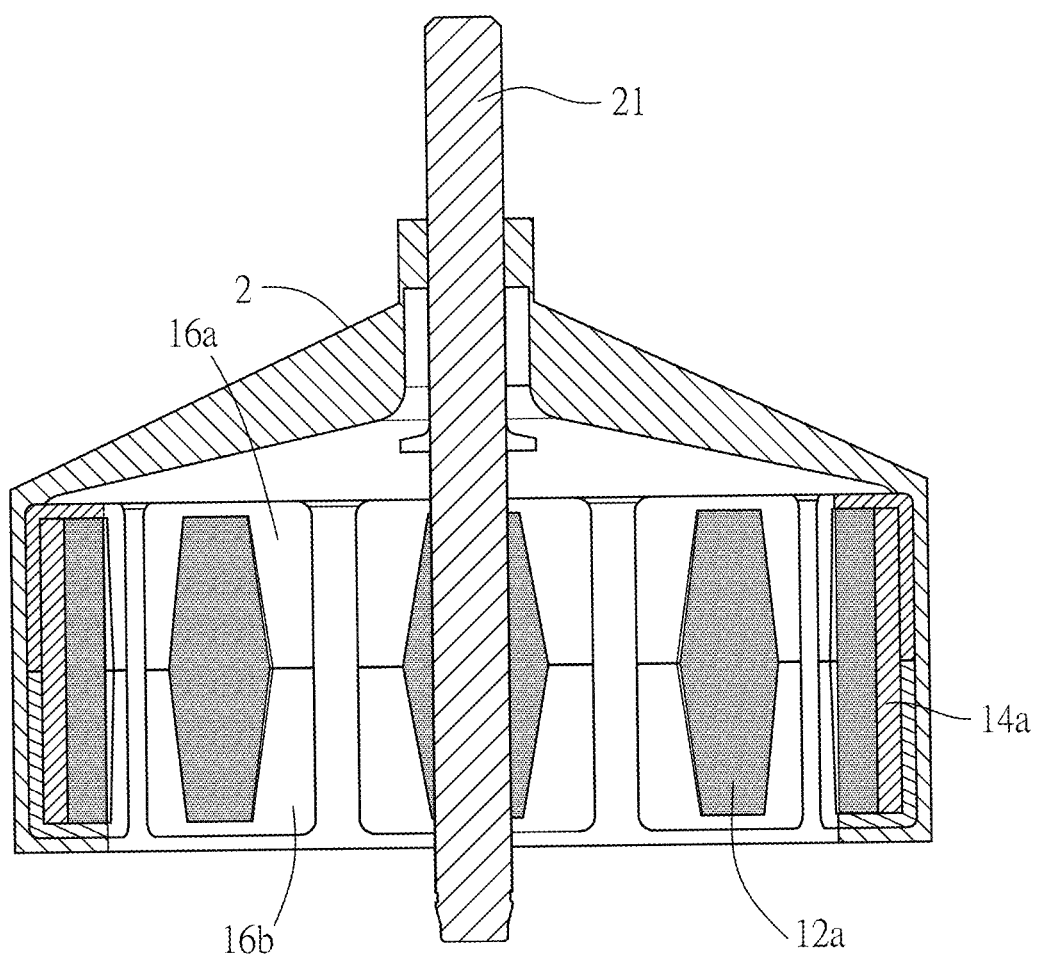
FIG. 6 is a sectional view of FIG. 5 along a line AA.

FIG. 5 is a schematic diagram showing the magnet module 1a of FIG. 3 in cooperation with a rotor structure 2. FIG. 6 is a sectional view of FIG. 5 along a line AA.

The magnet module 1a can be further applied to a fan. The assembled magnet module 1a is installed in the rotor structure 2 by way of insert molding, adhering or engagement.

In addition, once the magnet module 1a and the rotor structure 2 are assembled by this method, the operators for manually assembling the magnet module 1a and the rotor structure 2 in the conventional way are no longer needed. Therefore, the cost of manpower and machine in this process can be reduced in the actual production line.

Moreover, this method for assembling the rotor structure 2 and the assembled magnet module 1a can further enhance the fixing and positioning of the sintered magnet structures 12a and the magnetic permeable casing 14a of the magnet module 1a.

To be noted, if the magnet module 1 of the first embodiment is used, the fixing member 16 only needs to form a locking recess or an accommodating space. After the sintered magnet structures 12 and the magnetic permeable casing 14 are positioned, the rotor structure 2 is bonded with the magnet module 1 by insert molding or engagement so as to enclose the locking recess or accommodating space. Accordingly, the sintered magnet structures 12 and the magnetic permeable casing 14 can be well positioned. The advantages of this method is that the components of the fixing member 16 (as well as the entire weight of the fixing member 16) can be reduced. Besides, the design of the fixing member 16 is more flexible, the structure thereof is simplified, and the manufacturing cost thereof can be easily adjusted and maintained.

Figure 7:
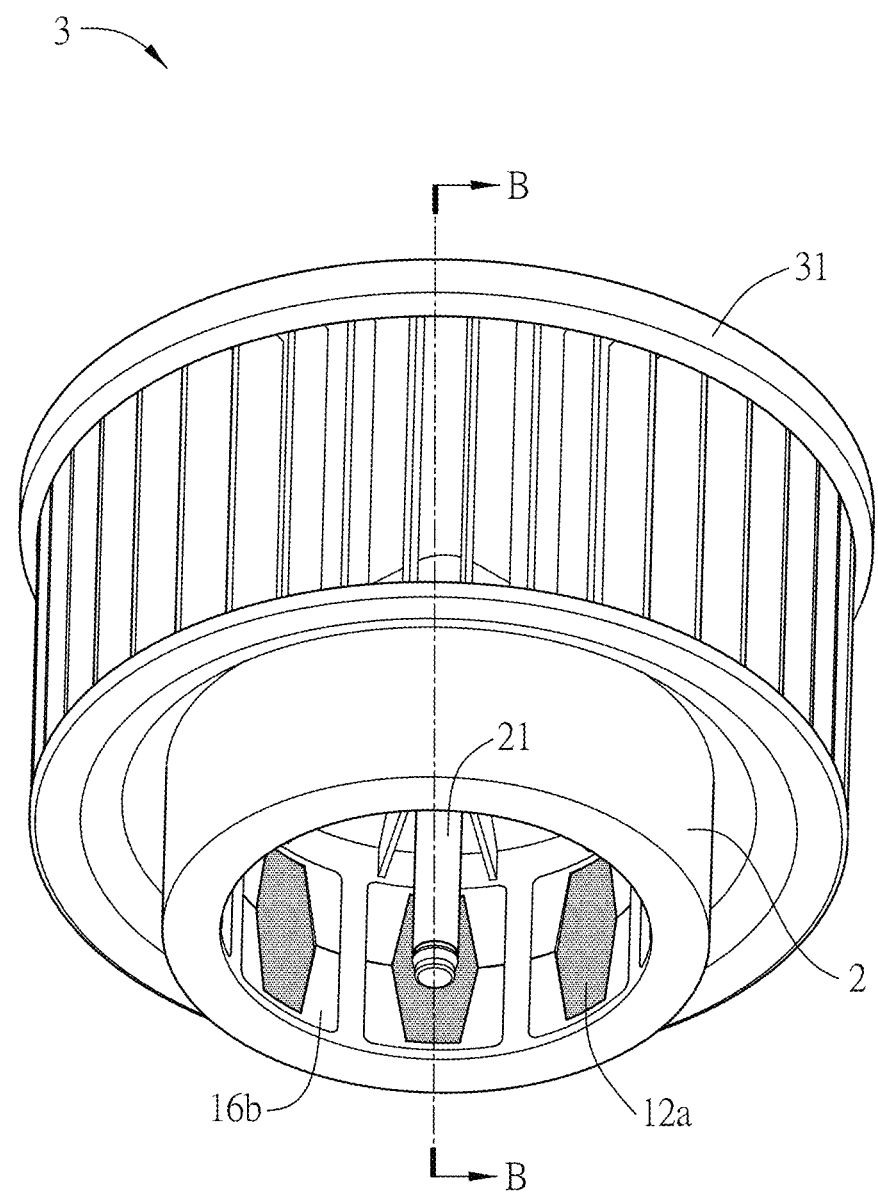
FIG. 7 is a schematic diagram of a magnet module of the invention applied to a fan.
Figure 8:
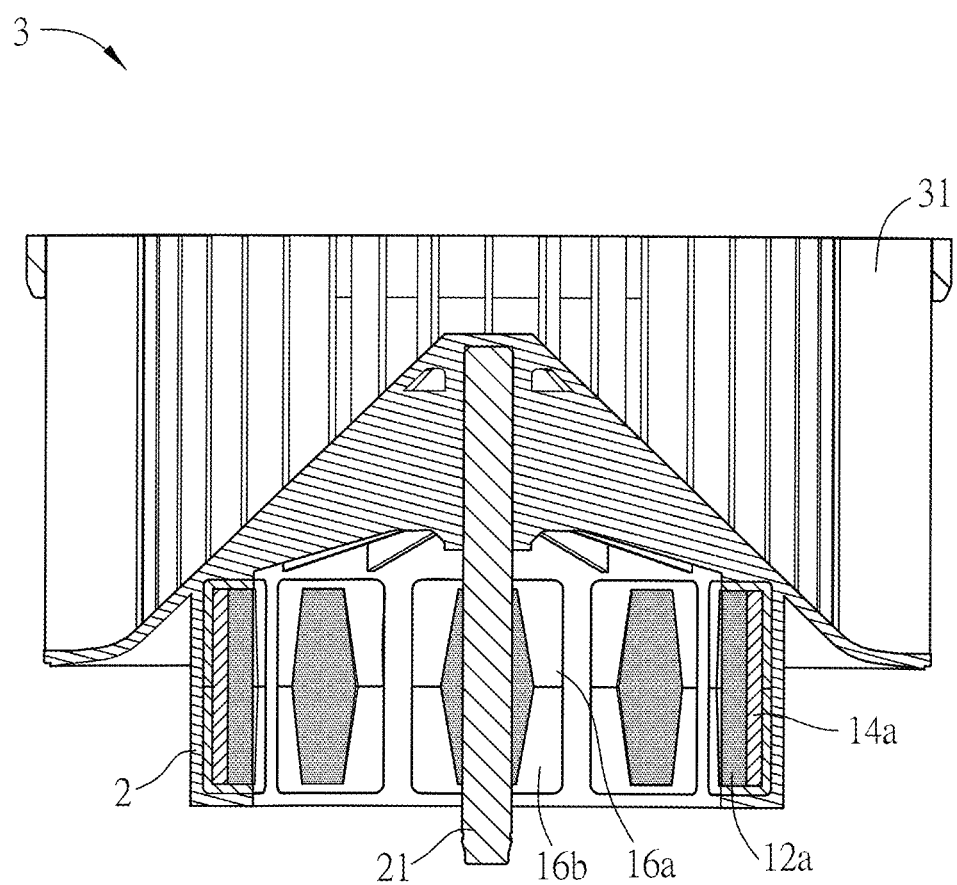
FIG. 8 is a sectional view of FIG. 7 along a line BB.

FIG. 7 is a schematic diagram of a magnet module of the invention applied to a fan, and FIG. 8 is a sectional view of FIG. 7 along a line BB.

As mentioned above, the magnet module 1a (the second embodiment) can be further applied to a fan 3. The fan 3 includes a frame 31, a stator structure (not shown), a rotor structure 2 and a magnet module 1a. The stator structure is connected with the frame 31, and the rotor structure 2 is disposed corresponding to the stator structure. The rotor structure 2 includes a shaft 21.

The frame 31 and the rotor structure 2 of the fan 3 can be formed by a single inert molding process (the frame 31 and the rotor structure 2 are integrated into a single piece). Accordingly, the conventional processes for separately forming the frame 31 and the rotor structure 2 and then combining them together are not needed, thereby decreasing the manufacturing cost and increasing the accuracy.

The other components of the magnet module 1a and the relationships therebetween are similar to the previous embodiment, so the detailed descriptions thereof will be omitted.

To sum up, in the magnet module of the invention, the sintered magnet structure(s) and the magnetic permeable casing are assembled in advance via the fixing member instead of the conventional attaching method by glue. This modification can improve the conventional problems of the attaching process in completely coating the glue and detecting the glue coating result.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A magnet module, comprising:
   at least one fixing ring, comprising:
      a ring body;
      an axial passage axially through the ring body; and
      a slot inside the ring body, having at least one radially varied-width slot portion, a circular slot portion, an outer lateral at the ring body, an inner lateral, a bottom connected between the outer lateral and the inner lateral to form the varied-width slot portion and the circular slot portion between the outer lateral and the inner lateral, wherein the ring body, the outer lateral, the inner lateral and the bottom are integrally formed as one piece, wherein the axial passage, the inner lateral, the varied-width slot portion, the circular slot portion, the outer lateral and the ring body are in order in a radial direction outwardly;
   a magnetic permeable casing, axially inserted into the circular slot portion of the slot, fixedly accommodated and positioned in the circular slot portion of the slot; and
   a sintered magnet structure, axially inserted into the varied-width slot portion of the slot, fixedly accommodated and positioned in the varied-width slot portion of the slot, and facing the axial passage of the fixing ring, wherein the sintered magnet structure comprises a plurality of sintered magnets arranged in series to form a circular ring shape, and each of the sintered magnets is located on the circular ring shape,
   wherein the sintered magnet structure, the magnetic permeable casing and the fixing ring are fixed together by axial fully insert molding.

2. The magnet module of claim 1, wherein the sintered magnet structure has a varied thickness, and the sintered magnet structure is thickest at its middle.

3. The magnet module of claim 1, wherein the magnetic permeable casing has an uniform thickness, and the sintered magnet structure has a varied thickness.

4. The magnet module of claim 1, comprising two of the fixing ring.

5. The magnet module of claim 4, wherein the slots of the two fixing rings are communicated with each other, and the sintered magnet structure and the magnetic permeable casing are fully inserted into the slots of the two fixing rings.

6. The magnet module of claim 1, wherein the sintered magnet structure is a ferric oxide magnet.

7. The magnet module of claim 1, wherein the inner lateral has a plurality of claws extending axially from the bottom, and the sintered magnet structure is radially disposed between the claws and the magnetic permeable casing.

8. The magnet module of claim 1, wherein the sintered magnet structure is connected to a rotor structure.

9. The magnet module of claim 1, wherein the magnetic permeable casing is ring-shaped.

10. The magnet module of claim 1, wherein the sintered magnet structure and the magnetic permeable casing are in direct contact.

11. A fan, comprising:
    a frame;
    a stator structure connected to the frame;
    a rotor structure disposed corresponding to the stator structure and having a shaft; and
    a magnet module of claim 1, connected to the rotor structure.

* * * * *